United States Patent [19]
Raman et al.

[11] Patent Number: 6,049,809
[45] Date of Patent: Apr. 11, 2000

[54] REPLICATION OPTIMIZATION SYSTEM AND METHOD

[75] Inventors: Balan S. Raman, Redmond; Arnold S. Miller, Bellevue; Dave D. Straube, Redmond, all of Wash.; Shioupyn Shen, Milpitas, Calif.

[73] Assignee: Microsoft Corporation, Redmond, Wash.

[21] Appl. No.: 08/739,948

[22] Filed: Oct. 30, 1996

[51] Int. Cl.$^7$ .................................................. G06F 17/30
[52] U.S. Cl. ........................ 707/203; 707/204; 707/205; 380/25; 711/141
[58] Field of Search ................................. 707/201, 202, 707/203, 200, 204, 1, 3; 711/141; 380/25

[56] References Cited

U.S. PATENT DOCUMENTS

| | | | |
|---|---|---|---|
| 4,432,057 | 2/1984 | Daniell et al. | 707/8 |
| 4,620,276 | 10/1986 | Daniell et al. | 709/201 |
| 4,714,995 | 12/1987 | Materna et al. | 364/200 |
| 4,714,996 | 12/1987 | Gladney et al. | 707/203 |
| 4,809,170 | 2/1989 | Leblang et al. | 395/703 |
| 4,853,843 | 8/1989 | Ecklund | 707/203 |
| 4,875,159 | 10/1989 | Cary et al. | 707/203 |
| 4,887,204 | 12/1989 | Johnson et al. | 707/10 |
| 4,888,681 | 12/1989 | Barnea et al. | 707/101 |
| 4,954,941 | 9/1990 | Redman | 395/712 |
| 5,001,628 | 3/1991 | Johnson et al. | 707/10 |
| 5,032,979 | 7/1991 | Hecht et al. | 713/201 |
| 5,109,486 | 4/1992 | Seymour | 395/200 |
| 5,113,519 | 5/1992 | Johnson et al. | 707/201 |
| 5,133,075 | 7/1992 | Risch | 395/800 |

(List continued on next page.)

OTHER PUBLICATIONS

"Xcopy Function for Access Control Profiles," *IBM Technical Disclosure Bulletin*, vol. 37(1), 573–574 (1994).

Bierer, et al., *NetWare 4 for Professionals*, New Riders Publishing, 343–374, 420–421, 432–435 and 971–1045 (1993).

Brooks–Hickerson, et al., "Managing Networked Workstations," *IEEE Spectrum*, 55–58 (1992).

Campell, Roy H. and Peter W. Madany, "Considerations of Persistence and Secuirty in Choices, an Object–Oriented Operating System," *In Proceedings on the International Workshop on Computer Architectures to Support Secuirty and Persistence of Information*, 290–300 (1990).

Coulouris, George F. and Jean Dollimore, "Distributed Systems—Concepts and Design," Sections 8.4 and 10.9, 211–225 and 293–299, No–date.

Fowler, et al., "A User–Level Replicated File System," *In Proceedings of the Summer 1993 Usenix Technical Conference*, 279–290 (1993).

Hac, Anna, "A Distributed Algorithm for Performance Improvement Through File Replication, File Migration, and Process Migration," *IEEE Transactions on Software Engineering*, vol. 15(11), 1459–1470 (1989).

(List continued on next page.)

*Primary Examiner*—Paul R. Lintz
*Assistant Examiner*—Charles L. Rones
*Attorney, Agent, or Firm*—Leydig, Voit & Mayer, Ltd

[57] ABSTRACT

A system and method of efficiently replicating data structures in a distributed system of replicas. Each replica in the distributed system maintains a cursor indicative of the extent to which other replicas in the system are consistent with one another. By examining the information in its cursor, a destination replica requesting replication from a source replica is able to determine the extent to which it has been made consistent with that source replica via indirect paths, thus potentially improving the starting point of replication. The source replica similarly examines its cursor to potentially improve the starting point of replication with respect to the starting point requested by the destination replica. In this manner, redundant information transmitted from a source replica when replicating a destination replica is reduced. The reduction in the amount of transmitted replication data is particularly appreciable when the replication topology of the system is changed such as by adding a new connection between existing replicas or by adding a new replica to the system.

22 Claims, 12 Drawing Sheets

U.S. PATENT DOCUMENTS

| | | | |
|---|---|---|---|
| 5,151,989 | 9/1992 | Johnson et al. | 709/10 |
| 5,155,847 | 10/1992 | Kirouac et al. | 709/221 |
| 5,170,480 | 12/1992 | Mohan et al. | 707/201 |
| 5,202,971 | 4/1993 | Henson et al. | 707/8 |
| 5,214,776 | 5/1993 | Bagnoli et al. | 711/141 |
| 5,222,217 | 6/1993 | Blount et al. | 707/204 |
| 5,247,673 | 9/1993 | Costa et al. | 711/205 |
| 5,261,094 | 11/1993 | Everson et al. | 707/201 |
| 5,274,789 | 12/1993 | Costa et al. | 711/206 |
| 5,278,979 | 1/1994 | Foster et al. | 707/203 |
| 5,285,528 | 2/1994 | Hart | 710/200 |
| 5,287,453 | 2/1994 | Roberts | 709/201 |
| 5,307,481 | 4/1994 | Shimazaki et al. | 714/11 |
| 5,313,646 | 5/1994 | Hendricks et al. | 707/101 |
| 5,333,265 | 7/1994 | Orimo et al. | 709/201 |
| 5,333,310 | 7/1994 | Sakai | 707/8 |
| 5,388,255 | 2/1995 | Pytlik et al. | 707/4 |
| 5,434,994 | 7/1995 | Shaheen et al. | 395/500 |
| 5,452,448 | 9/1995 | Sakuraba et al. | 707/203 |
| 5,471,629 | 11/1995 | Risch et al. | 707/201 |
| 5,551,034 | 8/1996 | Herz | 709/106 |
| 5,586,310 | 12/1996 | Sharman | 707/10 |
| 5,588,147 | 12/1996 | Neeman et al. | 707/1 |
| 5,600,834 | 2/1997 | Howard | 707/201 |
| 5,649,195 | 7/1997 | Scott et al. | 707/201 |
| 5,675,802 | 10/1997 | Allen et al. | 395/703 |
| 5,740,433 | 4/1998 | Carr et al. | 707/202 |
| 5,757,920 | 5/1998 | Misra et al. | 380/25 |
| 5,765,171 | 12/1998 | Gehani et al. | 707/203 |
| 5,832,514 | 11/1998 | Norin et al. | 707/202 |

OTHER PUBLICATIONS

Kumar, Puneet and M. Satyanarayanan, "Log–Based Directory Resolution in the Coda File System," *IEEE Proceedings of the Second International Conference on Parallel and Distributed Information Systems,* 202–213 (1993).

Martin et al., "Development of the VAXDistributed Name Service," *Digital Technical Journal,* vol. 9, 9–15 (1989).

Purdin, et al., "A File Replication Facility for Berkeley Unix," *Software–Practice and Experience,* vol. 17 (12), 923–940 (1987).

Satyanarayanan, et al., "Coda: A Highly Available File System for a Distributed Workstation Environment," *IEEE,* vol. 19(4), 447–459 (1990).

Satyanarayanan, Mahadev, "Scalable, Secure, and Highly Available Distributed File Acess," *IEEE,* 9–21 (1990).

Schulman, Mark, *Que's Guide to Lotus Notes,* 51–55 and 268–312 (1993).

Siegel, et al., "Deceit: A Flexible Distributed File System," *Technical Report for Department of Computer Science, Ithaca, New York,* 1–34 (1989).

Symborski, Carl W., "Updating Software and Configuration Data in a Distributed Communications Network," *IEEE,* 331–338 (1988).

Walker et al., "The Locus Distributed Operating System," *Operating Systems Review,* vol. 17(15), 49–70 (1983).

Wedde et al., "Operating System Support for Adaptive Distributed Real–Time Systems in Dragon Slayer," *Operating Systems Review,* vol. 23(3), 126–136 (1989).

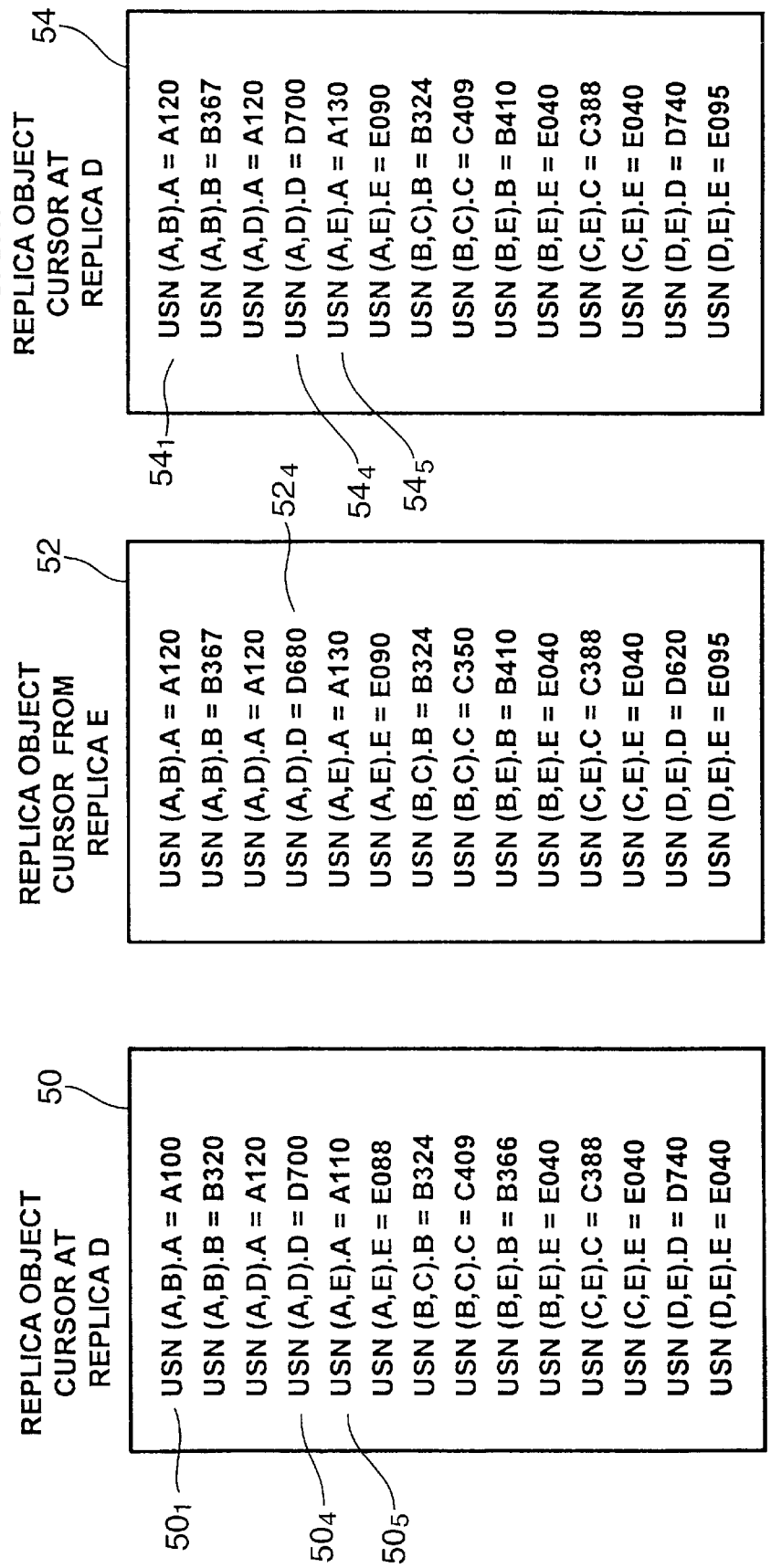

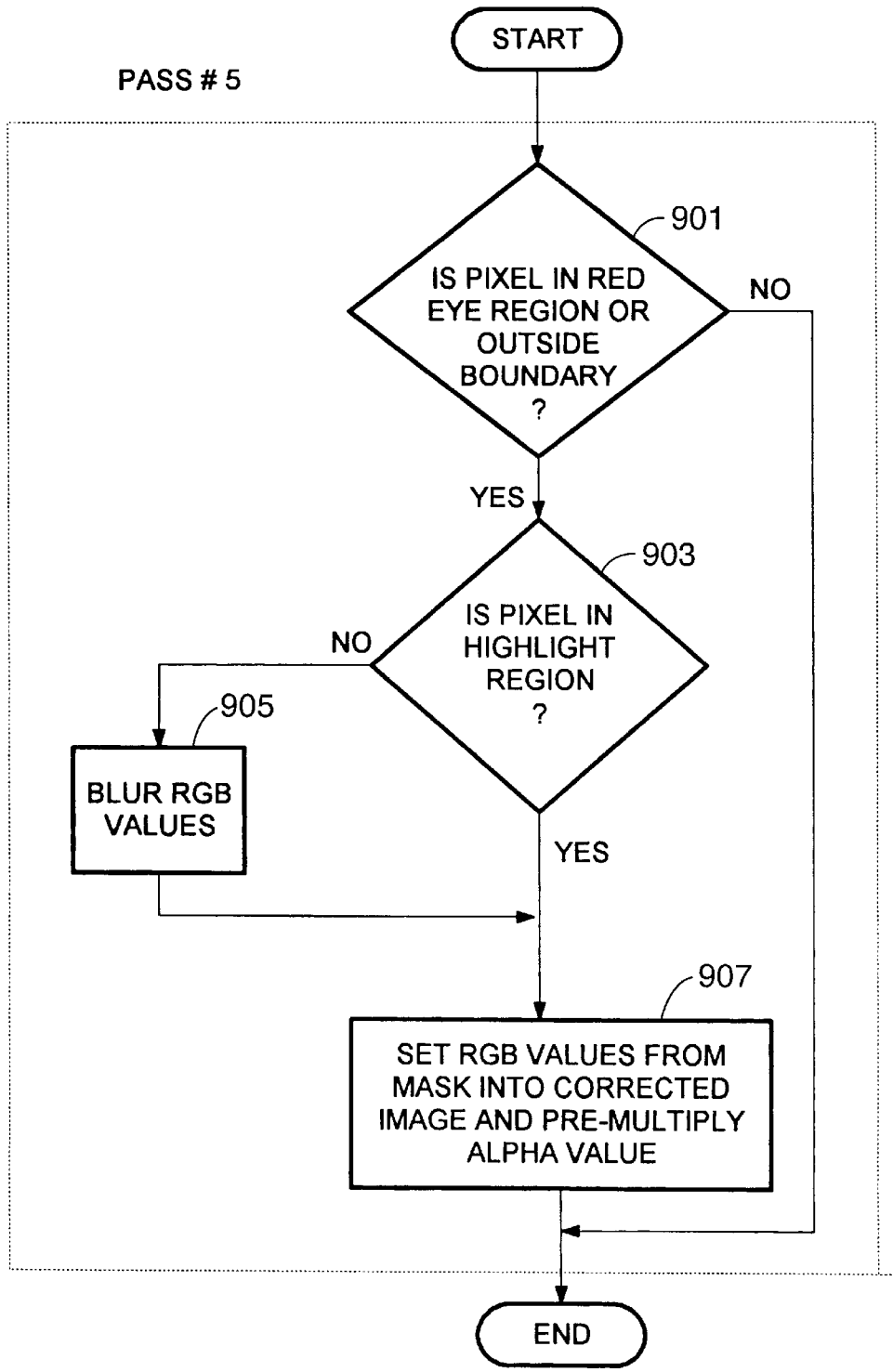

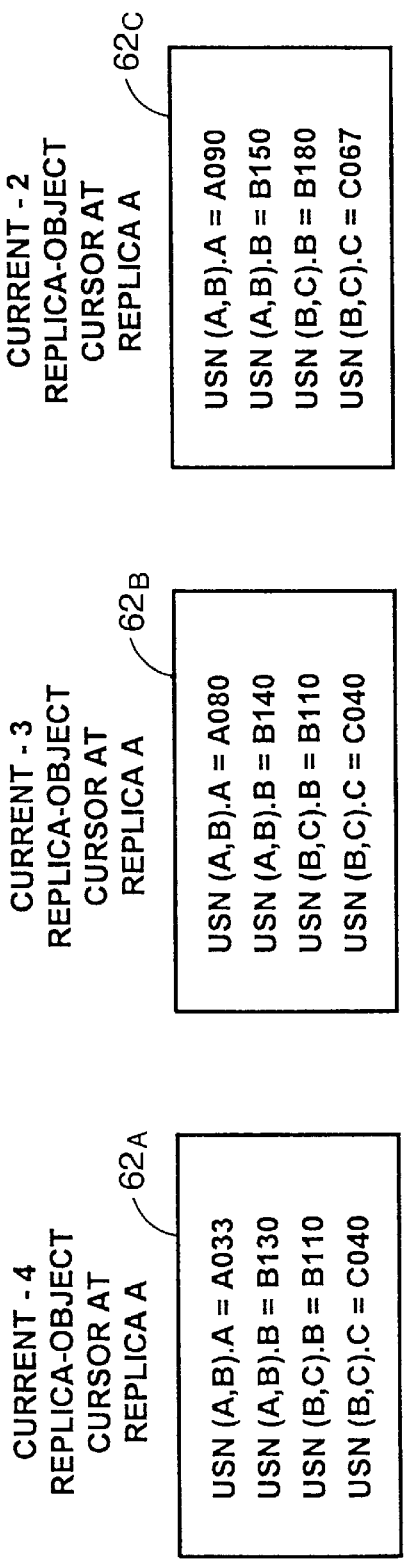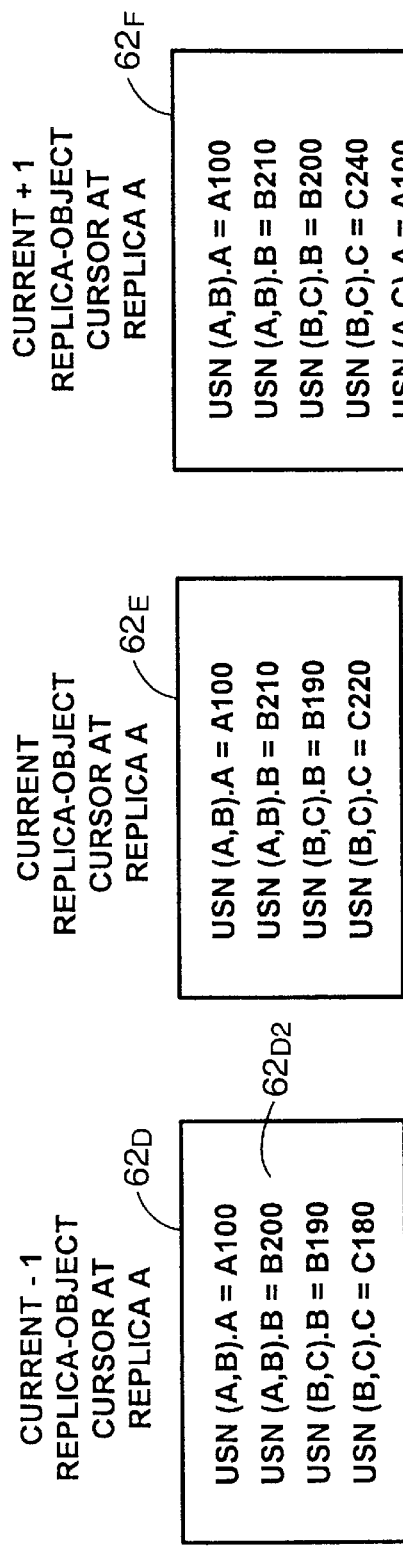

REPLICATION OPTIMIZATION SYSTEM AND METHOD

FIELD OF THE INVENTION

The present invention relates generally to facilities for replicating data in a distributed system, and more particularly to an improved system and method for more optimally replicating data in a distributed network environment.

BACKGROUND OF THE INVENTION

In a distributed network environment, multiple copies of replicated data, such as multiple copies of files, objects, directory structures, programs or databases, are often distributed throughout the network. For example, in a wide area network (WAN) comprised of multiple local area networks (LANs), a separate copy of replicated data may reside in at least one file server or workstation located on each of the LANs.

A benefit to having replicated data in the above-described distributed network includes facilitating access to the replicated data by each of the nodes on the network. Nodes may simply obtain the desired data locally on their LAN rather than seeking the data from another node on the WAN in a perhaps more costly and time-consuming manner. In addition, replicated data helps to distribute the load on any given node which would otherwise have to maintain the data and respond to all requests for such data from all other nodes on the network. A further benefit includes enhancing system reliability, e.g., no one node (which may fail) exclusively possesses access to required data. Databases, network directory services and groupware are typical products that take advantage of replication.

Since replicated data may change and multiple copies of the replicated data are distributed throughout the network, replication facilities must typically employ some scheme for reconciling any differences and ensuring a certain amount of consistency between the replica set. A replica set is considered to have strong consistency if the changes to the data are reconciled simultaneously throughout the set at some ordained time. Weak consistency is a concept which allows the replicas to be moderately, yet tolerably, inconsistent at various times.

As can be appreciated, maintaining strong consistency generally requires the use of more resources, e.g., at least in terms of reduced available bandwidth. Moreover, strong consistency becomes more and more impractical, and at some point almost impossible to guarantee, as the number of replicas increases in a distributed system. This is mostly due to performance limitations, network partitioning, and the like. Consequently, most replicated systems are designed to implement some level of weak consistency.

Replication can conceptually be considered to occur pairwise and in one direction. One replication facility that performs replication through the use of a standardized interface is described in U.S. Pat. No. 5,588147. The general replication topology described therein can be thought of as a graph of unidirectional edges where replication information is transmitted from a source to a destination. A replica node seeking replication (the destination) is responsible for originating a request for replication from a connected replica node (the source). This technique is known as pulling, since the destination attempts to pull the data from the source.

In the above facility, a cursor is maintained at the destination for each connection (edge) it has to a source from which it pulls data. Each cursor tracks the point of the last change information sent from a respective source to the destination. Using a cursor, when a destination requests replication from a given source, the source provides the destination with 1) a list of objects (or other data structures) that have changed and 2) the type of change which has occurred for each object since the last replication to that destination. To avoid unnecessary transmission, the source also filters from this list any change items which it knows were originated or propagated by the requesting destination. The source then updates the cursor maintained at the destination based upon the replication information provided during that replication cycle.

However, while such a replication facility has many advantages, it also has its inefficiencies. For example, resources may be unnecessarily utilized by transmitting redundant replicated data to a destination which already has some or all of the transmitted data. Such a situation may occur where a destination receives replicated data from more than one source. For example, if a destination replica A first requests and receives an update of replicated data from a source replica B and then requests an update of replicated data from a second source replica C, there is a possibility that replica A may have already received (via replica B in the first update) some or all of the replicated data which will be sent by replica C. Of course, the chances of receiving redundant replication information from an indirect path increase as distributed system topologies grow in complexity.

Although the transmission of some redundant replication information may be tolerable or insignificant at certain times depending upon the system resources, at other times such redundancy may be highly significant. For example, a substantial amount of redundant information is often replicated when the replication topology is changed. In the situation where a new connection is established between existing, but previously unconnected replica nodes, since the nodes had not been previously exchanging replication information, to maintain the desired replication scheme and ensure data integrity the entire replication information at each node is exchanged. Thus, one of the nodes initially functions as a source while the other functions as a destination, whereby replication and reconciliation of all replicated objects take place in a known manner. The two nodes may then reverse roles, whereupon both are consistent. As long as the new connection is maintained, the nodes exchange replication information on a regular basis, thus maintaining the desired consistency.

While this method of fully synchronizing newly connected replicas accomplishes the desired goal of consistency, a substantial amount of redundant information is often exchanged between replicas because of replication information which was indirectly received from other sources.

The problem of excessive transmission of redundant replication information is compounded when a new replica is added to a system and connected to a number of existing replicas. By way of example, if a new replica C is added to a distributed system and connected to both replicas A and B, then the new replica C will fully synchronize with A and then fully synchronize with B (or vice-versa). However, if A has already reconciled to some extent with B, then upon the second replication with B, replica C may pull a substantial amount of replication information from B which is duplicative of what it just pulled during the first replication from A. If the changes to the topology are even more complex, a relatively large amount of network resources can be inefficiently consumed through the communication of redundant information.

OBJECTS AND SUMMARY OF THE INVENTION

Accordingly, a primary objective of the present invention is to provide a system and method of efficiently replicating data structures in a distributed system of replicas.

In accomplishing that objective, a related objective of the invention is to provide a system and method of efficiently replicating data structures in a distributed system of replicas when the system topology is modified.

Another objective is to provide a replication facility that reduces the amount of redundant information that is communicated when synchronizing a pair of newly connected replicas in an existing system of replicas.

Yet another related objective is to reduce the amount of replication information that is communicated when synchronizing a new replica added to an existing system of replicas.

Still another objective of the invention is to provide a system and method as characterized above that function in an object-oriented environment.

Other objects and advantages will become apparent from the following detailed description when taken in conjunction with attached drawings, in which:

BRIEF DESCRIPTION OF THE DRAWINGS

FIG. 7 is a representation of a replica-object cursor maintained at a destination for tracking the extent to which each replica has replicated with each other replica;

FIG. 8 is a representation of a replica-object cursor received from a source during replication;

FIG. 9 is a representation of the replica-object cursor of FIG. 7 after updating the information therein with the replica-object cursor of FIG. 8;

FIGS. 13A–13F are a series replica-object cursors maintained at a replica node over a period of time;

Figure 1:
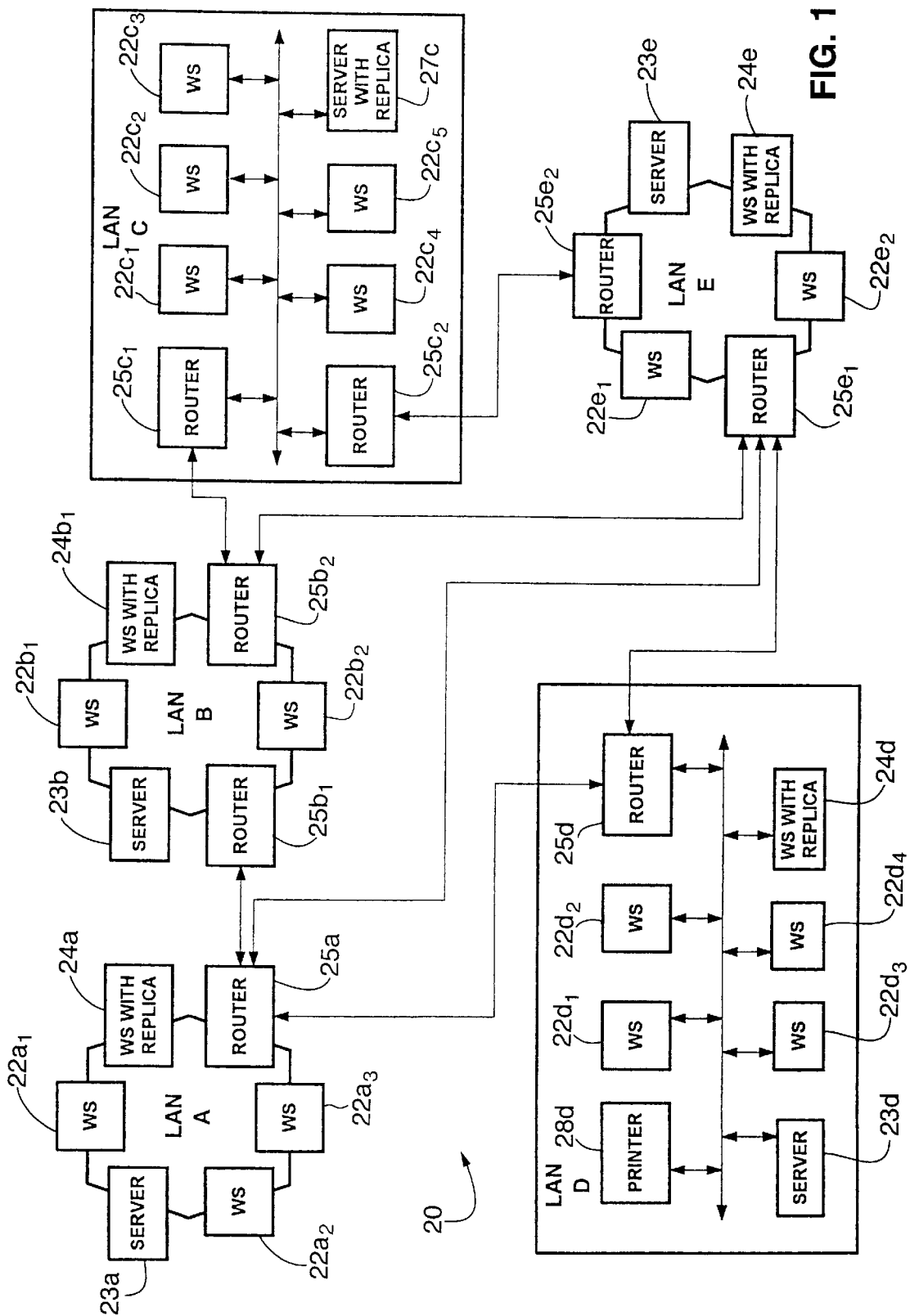
FIG. 1 is a block diagram showing a representative distributed system in which the invention may be implemented, having computer resources connected in a networked fashion.

While the invention is amenable to various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions, and equivalents falling within the spirit and scope of the invention.

DETAILED DESCRIPTION OF THE PREFERRED EMBODIMENT

Turning to the drawings and referring first to FIG. 1, there is shown a block diagram of a distributed system, generally designated 20, in which the replication facility of the present invention may be implemented. The distributed system 20 illustrated herein comprises a number of local area networks LAN A through LAN E, each LAN including a number of computer-based resources $22a_1$–$28d$. The LANs are interconnected into a larger network by routers $25a$–$25e$. Alternatively, the LANs may be interconnected by any combination of repeaters, bridges, routers, gateways or backbone networks (not shown) and may comprise one or more wide area networks (WANs).

The distributed system shown in FIG. 1 is intended to be exemplary of the type of distributed systems which are suitable for implementing the present invention. Each LAN shown in FIG. 1 may include a plurality of nodes comprising one or more workstations (e.g., $22a_1$–$22e_3$), servers (e.g., $23a$–$23e$), and routers (e.g., $25a_1$–$25e_2$). Other devices such as printer $28d$ of LAN D may also be connected. Although not required, as shown in FIG. 1, at least one node in each LAN has a replica therein, e.g., a volume wherein replicated data structures are stored. Thus, replicas are found in LAN A at the workstation $24a$, in LAN B at the workstation $24b$, in LAN C at file server $27c$, in LAN D at the workstation $24d$, and in LAN E at the workstation $24e$. Nevertheless, it can be appreciated that other local area networks may be connected to the system 20 without having a replica therein, or that any of the LANs may have more than one replica therein.

Although not explicitly shown in FIG. 1, the present invention may be implemented in a multiple bus network topology, for example where a network server links multiple networks together, including configurations wherein the networks are running separate network operating systems. In addition, the present invention may be implemented on various types of networking topologies including bus, ring or star topologies.

Physically, the separate LANs and the various nodes within the LANs may be interconnected with any well known data transmission media, such as coaxial cable, fiber optic cable, DTMF or ISDN telephone lines, or the like, in accordance with a chosen standard for hardware interfaces within each of the devices. Such standards, including ARCnet®, Ethernet® and Token Ring®, and their associated hardware interfaces, are well known in the art, and thus are not described in detail herein. Suffice it to say that a wide variety of interface hardware and software are commercially available to connect computer-based resources in a distributed system.

As described above and as shown in more detail in FIG. 2, the LAN D includes client workstations $22d_1$–$22d_3$ and $24d$, which may be personal computers or the like, and other devices including other workstations (not shown), one or more network servers $23d$, printers $28d$ and/or routers $25d$ interconnected on a communications link 29. The client workstations $22d_1$–$22d_4$ and $24d$ of LAN D each include a memory $30_1$–$30_5$ having a distributed operating system 32 loaded therein. In the described embodiment, the workstation 24d acts as a replica by maintaining a copy of the replicated data, in its own file system (or the like), in replica volume 33. Within the distributed system 20, there is no requirement that the file systems of the various workstations or file servers having replicas be the same, as the replication facility utilized by the present invention is capable of replicating data independent of the specific file systems employed. Indeed, the replicas may be maintained in a memory independent of any file system. For example, a replica set may be maintained in the non-volatile random access memory (NVRAM) of a personal data assistant (PDA) or the like. However, for simplicity herein the replicas are generally referred to as being maintained in a file system.

Figure 2:
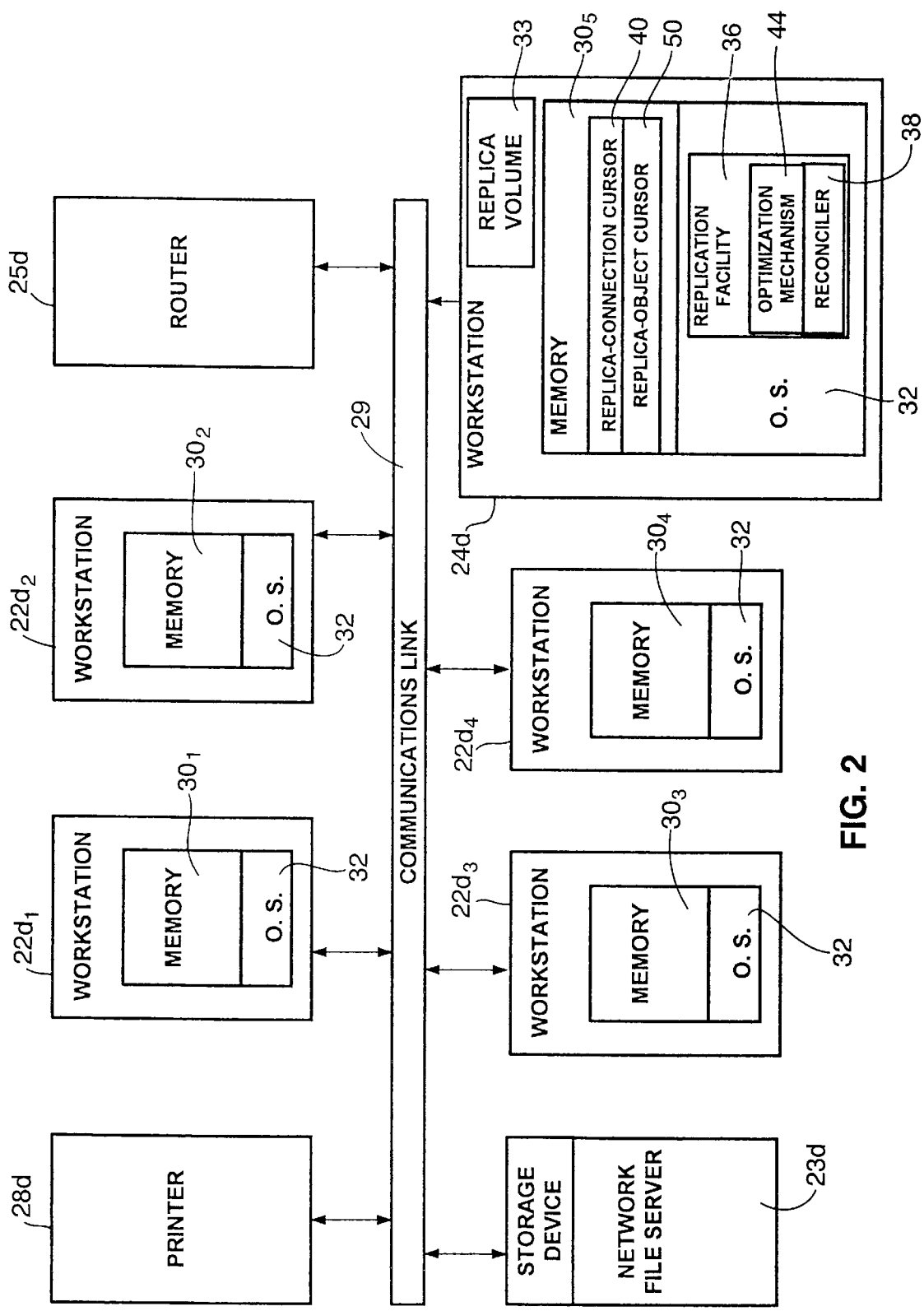
FIG. 2 is a block diagram showing a particular representative network including a replica node therein having a replication facility in accordance with the present invention.

In keeping with one aspect of the invention, as best shown in FIG. 2 the distributed operating system 32 of the workstation 24d includes a replication facility 36 for replicating data throughout the system 20. Although virtually any type of data including files and file directories may be replicated by the replication facility 36, replicated data will hereinafter ordinarily be referred to as objects, both for purposes of simplicity and because the replication facility 36 is particularly suitable for object-oriented environments.

Figure 6:
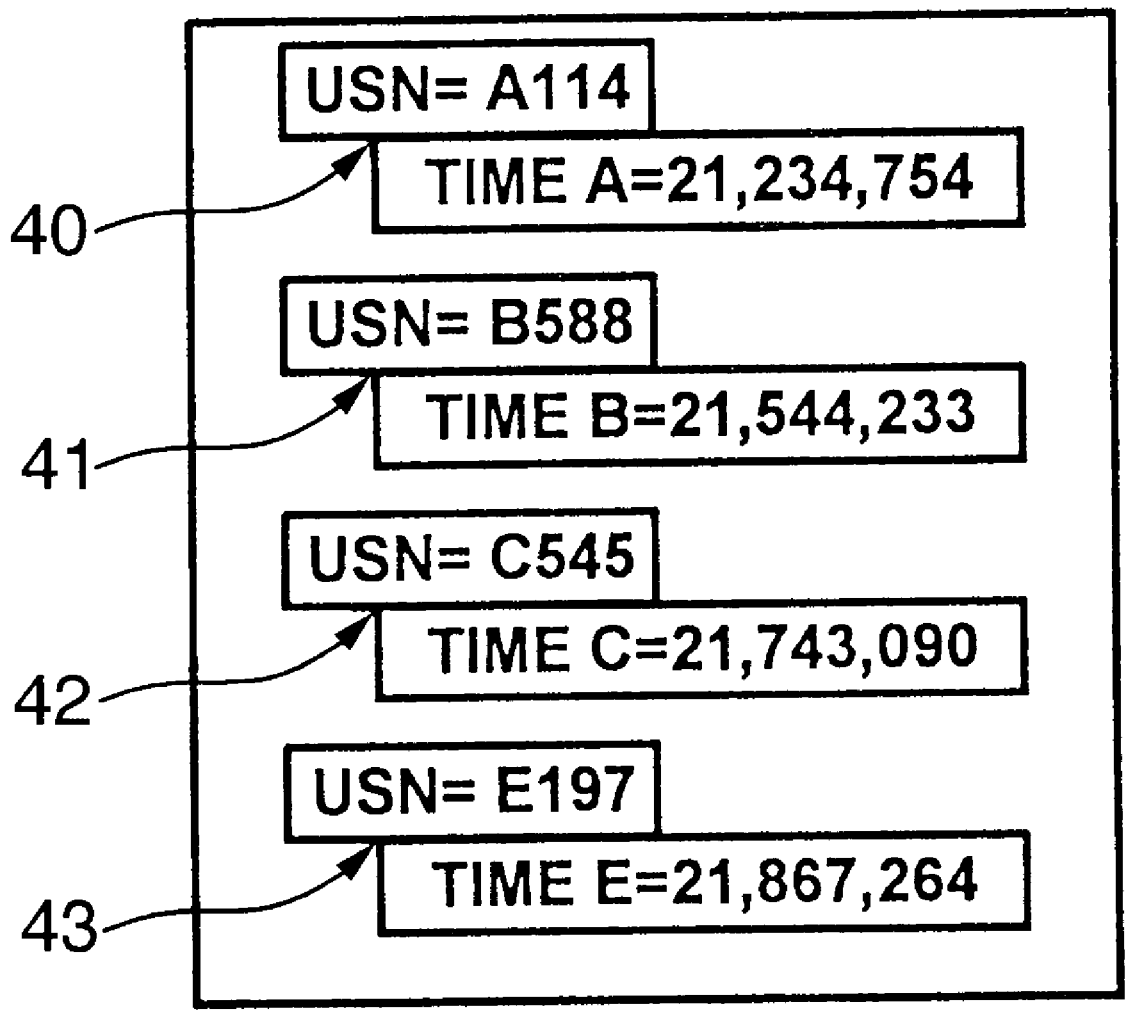
FIG. 6 is a representation of replication cursors maintained at a destination replica to track the point of last replication with each connected source replica.

One replication facility suitable for use with the present invention is described in U.S. Pat. No. 5,558,147, incorporated herein by reference in its entirety. In this system of replication, a cursor is maintained at each destination for each connection (edge) it has to a source, e.g., replica node D's cursors 40–43 of FIG. 6. Each cursor tracks the point of the last replication information sent from a respective connected source to the destination. Using an appropriate cursor for a source such as source A, when a destination such as replica node D requests replication, it provides source A with the appropriate cursor 40 to indicate from what point (e.g., time) the source A should begin providing the replication information to the destination D. A reconciler then changes the namespace and/or content of local objects on the destination to reflect changes made to remote counterpart objects at the source.

Such replication and reconciliation is performed on a pair-wise basis and in one direction, and enables multiple copies of objects to be replicated and reconciled across the distributed system 20. As used herein, the term "replication" should be considered as referring to both the replication and reconciliation of objects, where appropriate.

Moreover, although existing replication facilities are capable of reconciling through the use of time stamps, (i.e., the destination requests replica object changes at the source since a source time of X), the consistency of replicas cannot easily be guaranteed if times are reset at a given source node. For example, if a destination requests all changes known to a source replica since a source time T, the request may be improperly serviced if the present time at the source has been altered or reset with respect to T. As a result, to track the point from which replication should occur, the invention preferably utilizes cursors which maintain information regarding file system activity that is monotonic in nature. For example, in the situation where the object file system (OFS) is employed at a given workstation, the present invention utilizes update sequence numbers (USNs) in its cursors for this purpose.

By way of background, when OFS diskspace is initially formatted, an update sequence number (USN) is set to some floor value, (e.g., zero) in the OFS for that diskspace volume. After every create, modify, rename, delete or move operation, the USN is monotonically adjusted, i.e., increased for that disk volume. Unlike time (which can be modified and reset), USNs are only advanced. Therefore, it is preferable to use USNs or the like for replication according to the present invention, or otherwise ensure that the source times only advance monotonically. The OFS also maintains a move/rename/delete log that tracks changes to the name of an object.

Figure 3:
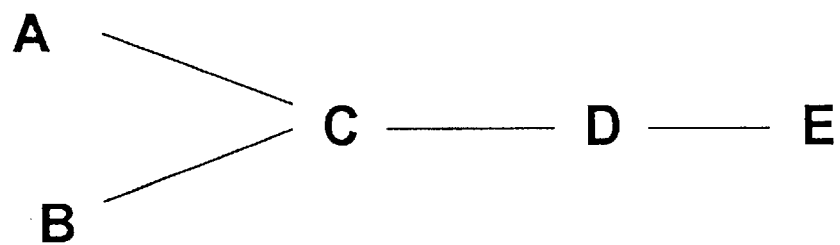
FIGS. 3–5 are diagrams representing three of the numerous possible topologies in which five replicas may be interconnected in a distributed system of replicas.
Figure 4:
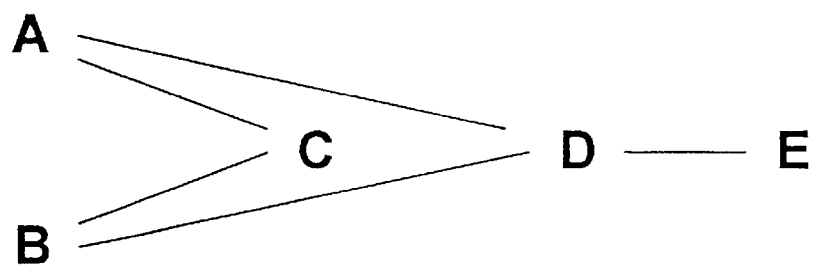
Figure 5:
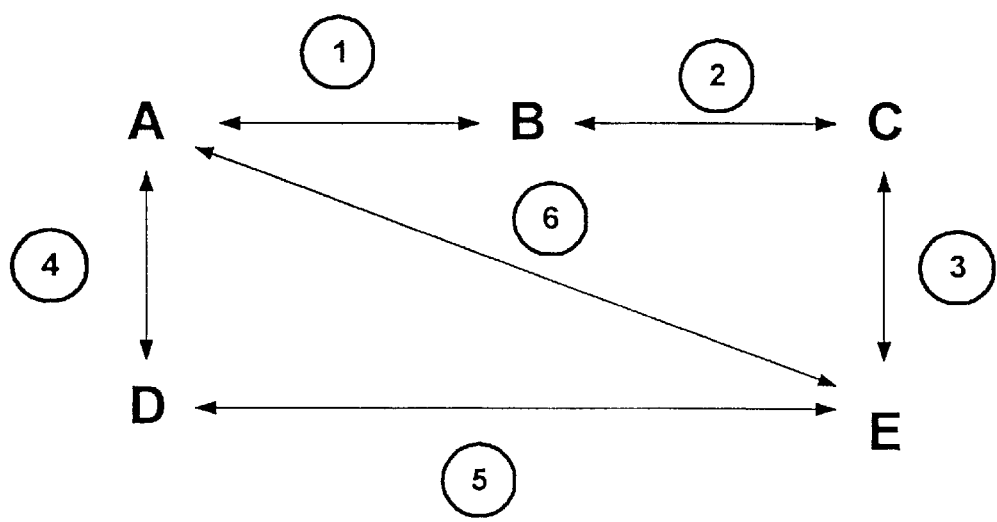

As evident from FIGS. 3–5, a relatively uncomplicated distributed system having only five replica nodes A–E can be interconnected in a large number of configurations. FIG. 3 is a simple topology wherein any changes made to replicated objects at replica node A are propagated through replica node C in order to reach replica node B, and vice-versa. Likewise, any changes made to replicated objects at replica nodes D or E are propagated through replica node C in order to reach replica nodes A and B. In the opposite direction, any changes made to replicated objects at replica nodes A or B are propagated through replica node C in order to reach replica nodes D and E. As can be appreciated, under certain circumstances replica node C may become heavily burdened in this topology. Moreover, if replica node C fails, the level of consistency between replica nodes may quickly become unacceptable.

FIG. 4 is a slightly more complex topology than that shown in FIG. 3. For example, changes made at replica node A can reach replica node B either through replica node C or replica node D. Thus, if replica node C fails, other replica nodes A, B, D and E may maintain consistency.

FIG. 5 shows a still more complex topology than shown in either of FIGS. 3 or 4. In this topology, each of the replica nodes has at least two, and possibly three paths to any other replica node. Accordingly, if any one of the replica nodes fails, the other four nodes will maintain consistency, although having fewer paths generally makes it longer for changes to be fully propagated through the system. In general, the richer the replication topology, the better the fault tolerance and the faster changes will propagate through the system. Thus, unlike tree topologies, it is generally desirable to add connections wherever and whenever the cost of doing so is justified.

While there are thus inherent advantages to increasing the complexity of the replication topology in a distributed system, as previously described with such a system, the potential exists for a significant amount of redundant information to be propagated through such a system. For example, in FIG. 5, changes made at replica node A may be propagated to replica node C via path A-B-C (over connections 1 and 2), path A-E-C (over connections 6 and 3), and path A-D-E-C (over connections 4, 5 and 3).

According to one aspect of the present invention, the replication facility 36 includes an optimization mechanism 44 (shown in FIG. 2) which reduces the amount of redundant information propagated through the system 20. To this end, each replica node maintains a replica-object cursor 50 (FIG. 7) that tracks the extent to which other replica nodes in the system are replicated with one another.

Figure 15:
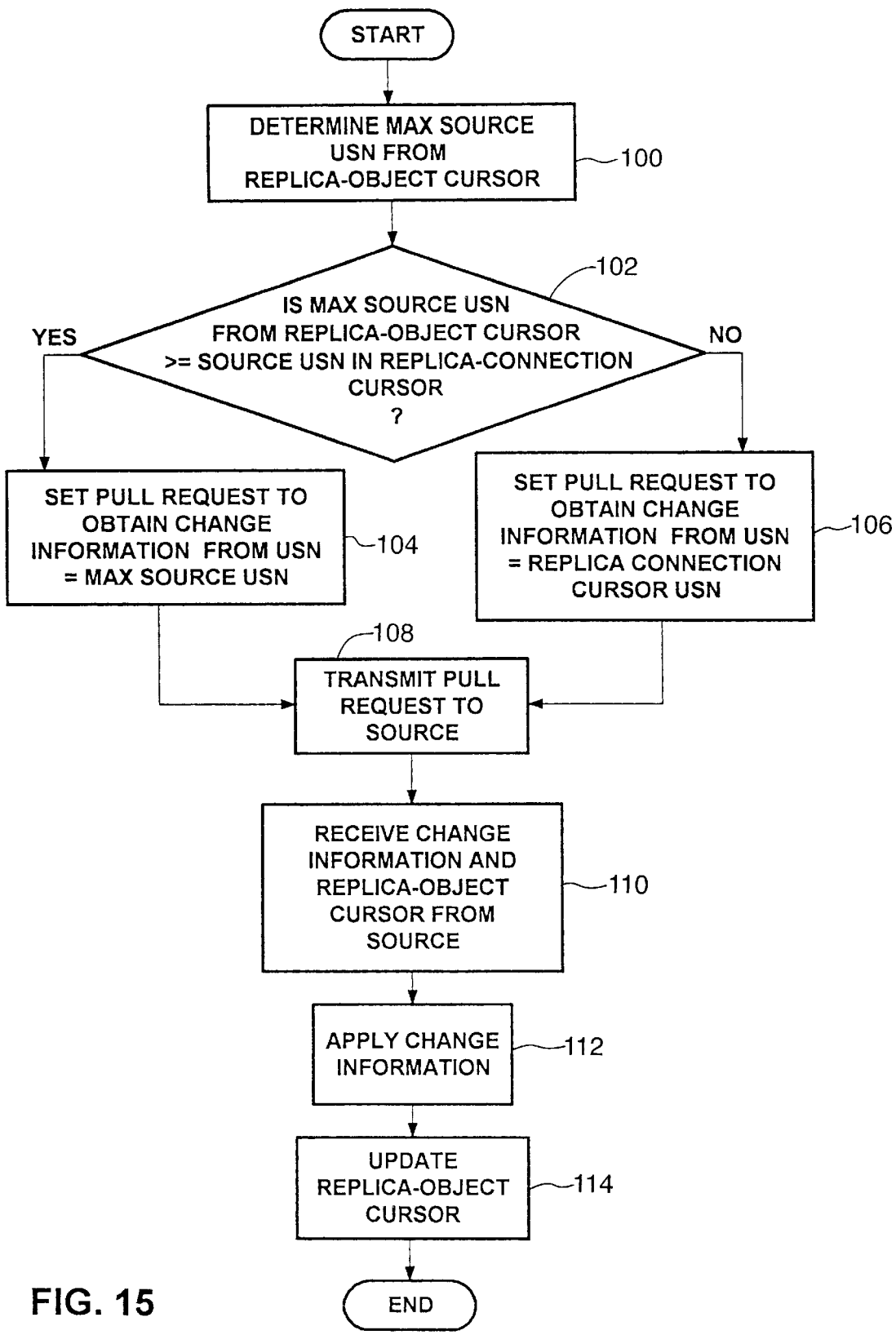
FIG. 15 is a flow diagram illustrating steps taken by a destination replica to pull replication information from a source replica.
Figure 16:
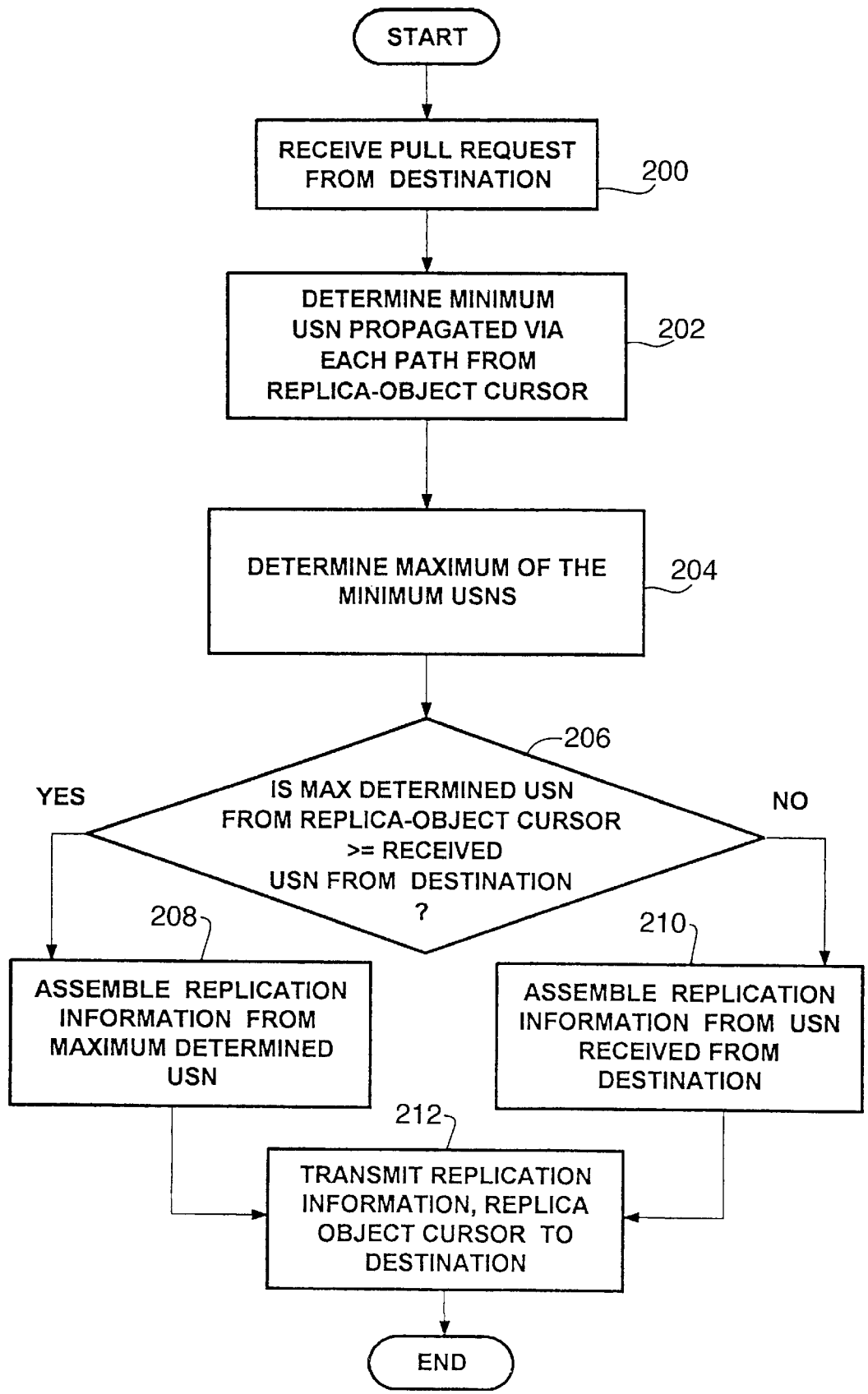
FIG. 16 is a flow diagram illustrating steps taken by a source replica to replicate data to a destination replica.

As shown in steps 100–108 in the flowchart of FIG. 15, with this information a destination node can more efficiently request replication information from a source node, by having knowledge of how up-to-date the destination node replica is with respect to the source node replica, for example, from a USN standpoint. Similarly, as shown in the flowchart of FIG. 16, using this information a source node can more efficiently send replication information to a requesting destination. Specifically, the source node can examine the various possible paths to the requesting destination node to determine to what extent the requesting destination node has already indirectly received replication information from it. Thus, the source node may often improve the starting USN (or the like), thereby minimizing the amount of replicated data sent.

At the end of the replication, the source replica transmits a copy of its replica-object cursor to the destination (step 212 of FIG. 16). With this cursor, the destination updates its own replica-object cursor (step 114 of FIG. 15) with the information therein, after it reconciles the received replication information at step 112. In this manner, whenever a destination node pulls replication information from a source replica, it obtains the benefit of that source's knowledge of the extent to which other replicas have been replicated.

FIGS. 7–9 show how a replica-object cursor 50 (FIG. 7) at a destination replica node D is updated by a replica-object cursor 52 (FIG. 8) received from a source replica node E. The replica-object cursor is arranged as an array of tagged values, wherein the tag is a peer replica and the value is the a USN at that peer replica. In the replica-object cursors shown herein, the convention USN(X,Y).Z has been adopted to represent the USN to which replica node Z is known to have been updated over the connection between replica nodes X and Y, wherein replica node Z represents either replica node X or replica node Y. Thus, the first entry of FIG. 7, $50_1$, informs replica node D that the USN stored at replica node A for the connection between source A and destination B is equal to A100. The replica-object cursors in FIGS. 7–9 correspond to the topology of FIG. 1, and thus store USNs for all connections in that topology. The topology may be derived from the connection pairs in the cursors, or may be stored elsewhere in the replica memory.

The cursor 54 of FIG. 9 represents replica node D's replica-object cursor (FIG. 7) after the optimization mechanism 44 at replica D has updated the cursor with replica E's replica-object cursor 52 of FIG. 8. To update, as shown at step 114 of FIG. 15, the optimization mechanism 44 replaces corresponding USN values if those values are larger than those already in the cursor. Thus, $50_1$ (USN=A100) is overwritten with a USN of A120 in $54_1$, but $50_4$ (USN=D700) is not overwritten in entry $54_4$ with the USN of D680 in $52_4$. In this manner, whenever a destination node pulls replication information from a source replica, it obtains the benefit of that source's knowledge of the extent to which other replicas have been replicated.

As shown in steps 100–108 of FIG. 15, a destination can use this information to improve the USN stored in its replica connection cursors 40–43 (FIG. 6) prior to its next request for replication. For example, if D has earlier pulled and applied replication information from E, then it knows from entry $54_5$ in its replica-object cursor 54 that replica E has been replicated up to USN A130. Thus, replica D has already received, via replica E, all of the changes made at A up to USN A130. Its replica connection cursor 40 (FIG. 6), however, may indicate that its last replication with A was only up to USN A114. In this instance, at steps 102–104 of FIG. 15 the destination replica node D improves its pull request by substituting the greater value of 130 in its replica-object cursor 54 into the replica connection cursor 40 it maintains for A, thus informing replica node A that it desires replication beginning with information after A's USN=130. In the event that the replica-object cursor does not contain a greater value, the replica connection cursor value is left intact and is used for replication (step 106). In either event, replication and reconciliation may then take place in a known manner, as generally shown in steps 108–112.

Figure 10:
FIGS. 10–11 are diagrams representing a new connection being added between existing replicas in a distributed system of replicas.
Figure 11:
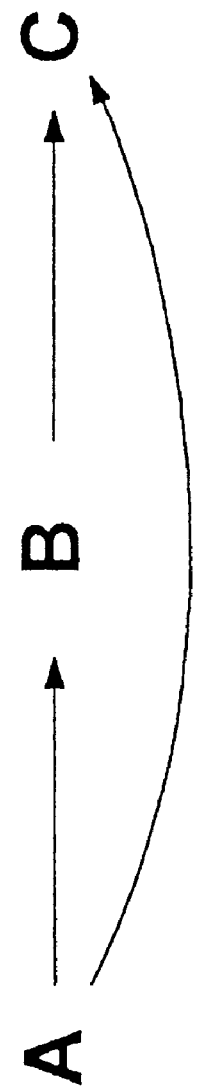

In addition to providing a mechanism for the destination to improve its starting source USN, the optimization mechanism 44 similarly provides the source with the ability to utilize the replica-object cursor to improve the starting source USN received from the destination. To illustrate how a source may further improve the USN maintained therefor at the destination to improve the point from where it begins sending information, FIG. 10 shows a simple topology of three replica nodes A, B and C, and FIG. 11 shows a modification to the topology wherein a new connection is added between the two previously unconnected nodes A and C. For purposes of the following examples, it is assumed that replication and reconciliation may occur among the three nodes at various times and in various orders that are not necessarily predetermined. For example, B may sometimes pull A twice before it receives any information from C, and C may sometimes delay before reconciling its objects with change information pulled from B. Thus, a new connection may be established between replica node C and A, and C may request replication from replica node A beginning at USN A050. This may occur, for example, if replica node C has just been connected to A but has not recently reconciled with B. As a result, the destination C is only able to improve its replica connection cursor from USN A000 to A050, via its replica-object cursor known from its last reconciliation with replica node B, in the above-described manner.

Figure 12:
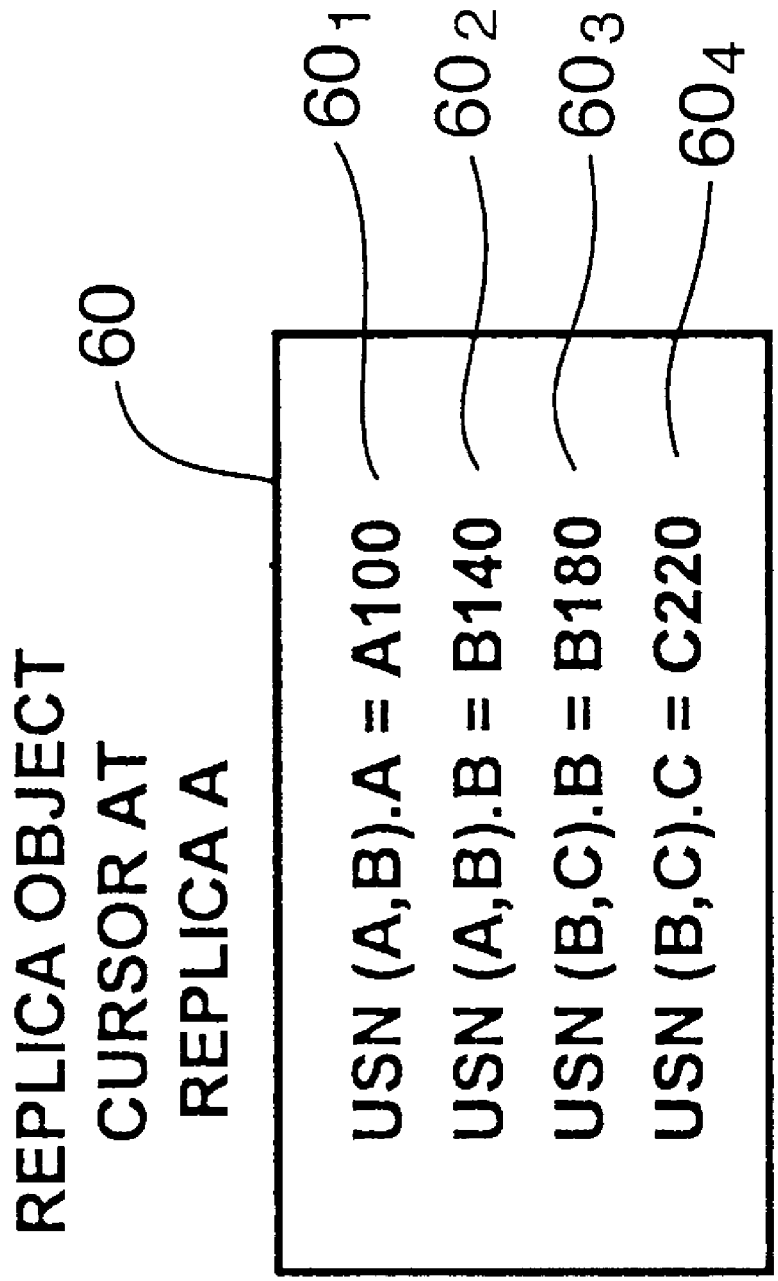
FIG. 12 is a representation of a replica-object cursor maintained at a node for tracking the extent to which the replicas of FIG. 10 have replicated with each other.

In a first example shown in FIG. 12, after receiving the request to replicate the destination C from USN A050 (step 200 of FIG. 16), the source A examines its replica-object cursor 60 (FIG. 12) at step 202. Since the source A possesses knowledge of the topology of the distributed system 20, source A knows that there is an indirect replication path from itself to replica node C via replica node B. The replica-object cursor 60 (FIG. 12) of A provides information at $60_3$ that replica node B has updated replica node C with all of B's changes up to B180, i.e., USN(B,C).B=B180. The replica-object cursor 60 of A further provides information at $60_2$ that replica node B has, as of the last time A pulled it, updated replica node A up to USN B140, i.e., USN (A,B).B=B140. Finally, the cursor 60 at $60_1$ indicates that B has A's changes, obtained the last time B pulled A, up to and including A100, i.e., USN (A,B).A=A100.

Using this information, the optimization mechanism in source A determines that all changes up to A100 have been indirectly propagated by replica node B to replica node C. This is certain, because replica node C is at B180, and changes up to B140 include changes up to A100. Thus, A may provide its changes to C from A100 rather than A050 as requested by C. In this topology, whenever USN(B,C).B is greater than or equal to USN(A,B).B, replica node A knows that C has indirectly received changes at replica node A up to USN(A,B).A.

If however, USN(B,C).B is less than USN(A,B).B, as shown in FIG. 13E, C has not received (via B) changes at replica node A up to USN(A,B).A. Replica node C may still have received some of A's changes from B, but the minimum value is not certain from an analysis of A's most recently updated cursor. In other words, A100 corresponds to B210, but C has only been updated by B until B190. Nevertheless, the mechanism 44 allows A to preserve, if desired, at least some of its previous replica-object cursors before it updates the values therein. From these previous cursors, it is still possible that full synchronization may be avoided.

For example, FIGS. 13A–13D represent four previous replica-object cursors 62a–62d that A has preserved. By going back in time, A may locate a USN (A,B).A that corresponds to a USN (A,B).B that is less than the current USN(B,C).B. Thus, A first looks back at its most recent cursor before the current cursor, replica-object cursor 62d of FIG. 13D, to determine if a USN (A,B).A can be found that corresponds to a USN(A,B).B that is less than the current USN(B,C).B=B190. As can be seen via cursor entry $62d_2$ of FIG. 13D, USN(A,B).B is at B200 which is greater than B190. Thus, the inequality is not satisfied and the optimization mechanism 44 continues to look back further to the replica-object cursor 62c of FIG. 13C. In this cursor it is seen that when B replicated A up to B150, (USN(A,B).B= B150), B had been replicated by A up to A090, (USN (A,B).A=A090). Since A is presently aware that C has been replicated up to B210, A knows that via B, C has received A's changes up to at least A090. Accordingly, A begins replicating C from USN A090 instead of USN A050 as requested by C, thus avoiding the redundant transmission of A's change information from A051 to A090. Of course, once the starting USN is established, as in earlier facilities the source A may filter replication information that it knows was originated or propagated by the requesting destination C.

In the event that A was not able to locate a previous replica-object cursor having a USN(B,C).B that satisfies the inequality USN(B,C).B>USN(A,B).B, full synchronization (from USN=A050) will be performed. This may be because only a certain number of previous replication optimization cursors may be preserved due to the cost of storing those cursors. As can be appreciated, the probability of avoiding a full synchronization is a function of the amount of history (previous replication optimization cursors) that is stored with each connection.

Regardless of how the USN number is improved, if at all, in the ordinary situation replica node A ultimately provides some replication information to replica node C. At that time, A adds a new entry to its replica-object cursor to reflect its new connection to C, as shown in FIG. 13F. The cursor $62_F$ is expanded, with information therein representing the extent that A has provided information to C, USN(A,C).A= A100. USN(A,C).C will be updated when A pulls and applies replication information from C.

More complex topologies function in the same manner as long as the replica optimization cursor stores information for alternate paths. For example, taking each possible path, a source replica node can determine the lowest (historically, if necessary) source USN that has propagated down that path to a requesting destination. For example, in FIG. 1 there are three paths to C from A, path A-D-E-C, A-E-C and A-B-C. From FIG. 7, using the previously-described inequality of USN(B,C).B>=USN(A,B).B, at step 202 of FIG. 16 the minimal USN on the A-B-C path is determined to be A100. Also at this step 202 and from FIG. 7, the lowest USN that propagated down the path A-D-E-C is determined by first determining what A has given E via node D. Since in FIG. 7 USN(D,E).D=D740 which is greater than USN (A,D).D= D700, node E is known by replica node A to be up to USN (A,D).A=A120. The remaining part of the path, USN (D,E) .E=E040 is equal to USN(CE).E=E040, and via this path replica node C has received all changes up to E040 which corresponds to A120. Of course, previous cursors can be referenced as necessary to determine the USN if the inequality is not satisfied, such as for the path A-E-C of FIG. 1. Once the value that has propagated down each path is known, at step 204 of FIG. 16 the largest of these is known to have indirectly reached the destination. At step 206 it is determined if this is larger than the value requested by the destination. The source may begin providing information from that maximum USN (step 208) or alternatively, from the USN provided by the destination (step 210). As previously described, the source also transmits its replica-object cursor 52 to the destination at step 212 so that the destination obtains the benefit of the source's knowledge of other replica node's replication statuses.

Indeed, it is possible to add a new connection in a distributed system wherein no replication is necessary to synchronize replicas. For example, if in FIG. 5 there is no direct connection (6) between A and E, replicas A, B, C, D, and E may achieve a state wherein every replica is fully synchronized with each other replica. For example, this may occur if no changes have been made to replicated data for a long time relative to the time it takes for changes to fully propagate through the system. If during such a steady state the connection (6) is established between replicas A and E, as can be appreciated there will not be any changes to replicate. The optimization mechanism of the present invention avoids replicating redundant data in this instance by requesting replication information beyond that which a source is able to provide, whereby no replication information will be returned.

Figure 14:
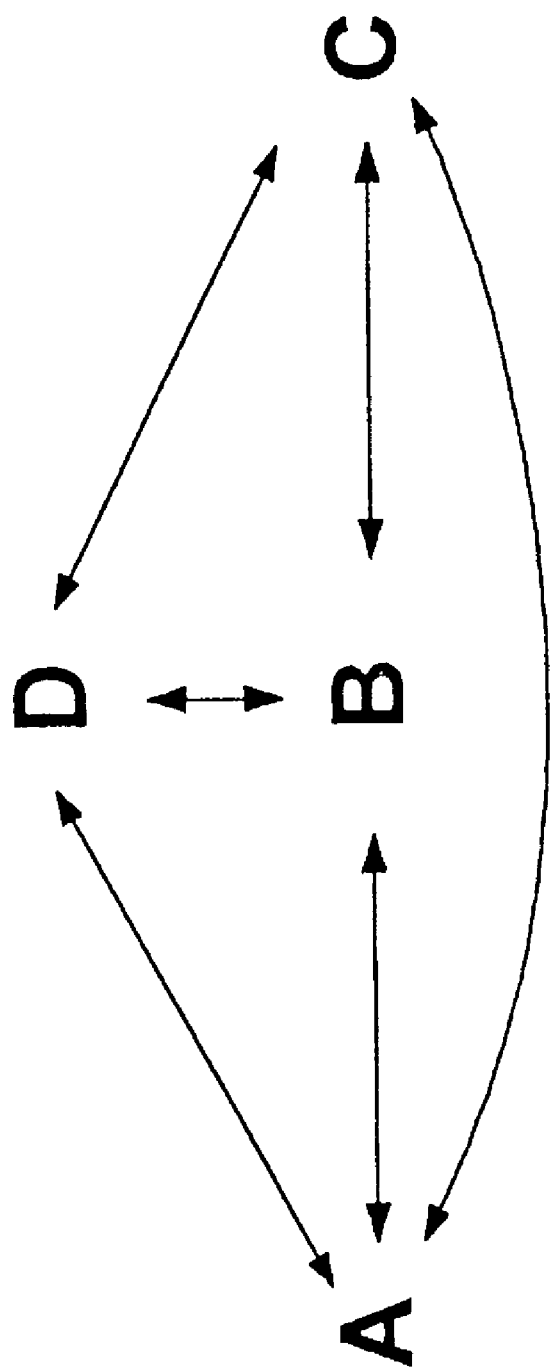
FIG. 14 is a diagram representing a new replica and connections thereto being added to the existing system of replicas of FIG. 11.

FIG. 14 represents a new node D added and connected to the other nodes in the distributed system of FIG. 11. As previously described, it is often desirable to connect a replica node to as many other replica nodes as possible, subject to cost-effectiveness. The new replica node may be added in a number of known ways, such as by using an out-of-band method, a restoration from a tape made from an existing replica, or even by a temporary connection to an existing replica from which the new replica is set up. With a temporary connection to an existing replica, the topology is changed after the new replica is set up, to provide the desired final configuration.

In general, a newly added replica is first fully synchronized with one other replica to which it is connected, or alternatively indirectly created with information from another replica. In either situation, during the initial replication cycle, the meta data including the total replication topology is known to the new replica. The replica-object cursor provided from the first source replica provides the new replica with a replica-object cursor which it uses to improve its stored USNs or the like (ordinarily at zero) with respect to other replicas, as described above. This is done before transmitting any pull requests to the next connected replica. For purposes of replication, after the first replication is completed, every other connected replica is handled as a new connection, as previously described. This is true even though the logical connection to another may have been established before the initial replication and reconciliation of the first source replica were completed. In this manner, rather than restarting from zero for each connection, the USNs sent to the next replica is improved by the replica-object cursor of the most recently replicated source replica.

As can be seen from the foregoing detailed description, there is provided a system and method for efficiently replicating data structures in a distributed system of replicas. The system and method are particularly effective in reducing or eliminating the communication of redundant information when the topology of an existing system of replicas is modified, such as when synchronizing a pair of newly connected replicas, or when synchronizing a newly added replica. Of course, the communication of redundant information is also reduced or eliminated while topologies are static, irrespective of adding nodes or changing connections. The system and method function efficiently in an object-oriented environment.

What is claimed is:

1. In a distributed computer system, a method of replicating data structures to replicas in the system, comprising the steps of:

maintaining a cursor at a source replica representative of the extent that the source and at least two other replicas in the system are consistent with each other;

receiving a request at the source replica to replicate a destination replica, the request including a starting point from which replication is desired;

evaluating the cursor to determine a value indicative of the extent to which the destination replica has been made consistent with the source replica;

comparing the determined value with the received starting point; and transmitting information from the determined value if the determined value with respect to the received starting point reduces the amount of replication information needed to make the destination replica consistent with the source replica.

2. The method of claim 1 wherein the source replica and destination replica are not initially connected to one another via a direct connection, and further comprising the step of establishing a direct connection therebetween.

3. The method of claim 1 wherein the received starting point and determined value comprise numbers which monotonically increase in value, and the step of comparing the determined value with the received value comprises the step of selecting the larger of the two values.

4. The method of claim 3 wherein the received starting point and determined value comprise update sequence numbers representative of operations performed at disk volumes comprising the replicas.

5. The method of claim 3 wherein a plurality of indirect replication paths exist between the source replica and the destination replica, and wherein the step of evaluating the cursor to determine a value comprises the steps of obtaining a plurality of values corresponding to the extent to which the source has been made consistent with the destination over each of the plurality of indirect paths.

6. The method of claim 1 further comprising the step of transmitting the cursor from the source replica to the destination replica.

7. In a distributed computer system of interconnected replicas wherein data structures are replicated from source replicas to destination replicas, a replication system at a source, comprising:

a memory including a cursor stored therein, the cursor including information representative of the extent that at least three replicas in the system are consistent with each other;

means for communicating with a destination replica, said means receiving a replication request from the destination replica including a starting point from which to replicate;

an optimization mechanism for evaluating the cursor to determine a value indicative of the extent to which the destination replica has been made consistent with the source, and further including means for comparing the determined value with the received starting point to determine if the determined value reduces the amount of replication information needed to make the destination replica consistent with the source replica; and a replication facility connected to the optimization means and the communication means for transmitting replication information to the destination replica based upon the determined value if the determined value reduces the amount of replication information needed to make the destination replica consistent with the source replica.

8. The replication system of claim 7 wherein the communication means further transmits the cursor from the source replica to the destination replica.

9. The replication system of claim 7 wherein the received starting point and determined value comprise numbers which monotonically increase in value, and wherein the optimization means compares the determined value with the starting to point to determine if the determined number is larger.

10. The replication system of claim 9 wherein a plurality of indirect replication paths exist between the source replica and the destination replica, and wherein the optimization means evaluates the cursor to obtain a plurality of values corresponding to the plurality of indirect paths.

11. In a distributed computer system, a method of replicating data structures among more than two replicas in the system, comprising the steps of:

maintaining information at a destination replica including a first value indicative of the extent that the destination replica has been made consistent with a source replica by a direct connection thereto, and a second value indicative of the extent that the destination replica has been made consistent with the source replica by an indirect connection through at least one other replica between the source replica and the destination replica;

comparing the first value with the second value to determine if the second value will reduce the amount of replication information needed to make the destination replica consistent with the source replica; and requesting replication from the source replica by providing the second value to the source replica when the comparison indicates that the second value will reduce the amount of replication information needed to make the destination replica consistent with the source replica, or by providing the first value to the source replica when the comparison indicates that the second value will not reduce the amount of replication information needed to make the destination replica consistent with the source replica.

12. The method of claim 11 wherein the source replica and destination replica are not initially connected to one another via a direct connection, and further comprising the step of establishing a direct connection therebetween.

13. The method of claim 11 wherein the first value comprises a number indicative of a previous point of replication with the source replica.

14. The method of claim 11 wherein first and second values comprise numbers which monotonically increase in value, and the step of comparing the determined value with the received value comprises the step of selecting the larger of the two values.

15. The method of claim 14 wherein the received starting point and determined value comprise update sequence numbers representative of operations performed at disk volumes comprising the replicas.

16. The method of claim 11 further comprising the step of receiving information at the destination replica from the source replica, the information comprising a cursor indicative of the extent other replicas in the system are consistent with each other as compiled by the source.

17. The method of claim 16 further comprising the step of updating information at the destination based upon the cursor received from the source.

18. In a distributed computer system of interconnected replica nodes, a method of replicating objects so as to be consistent among the replica nodes comprising the steps of:

maintaining a replica-object cursor at each replica node, each replica-object cursor including an identity for each connection between at least three replica nodes in the distributed system and a value associated therewith indicating the extent of replication of a node over that connection, and, at a destination node, selecting a source node for replication, accessing the cursor maintained in the destination node to determine which value indicates the extent that the destination node is replicated relative to the selected source node, communicating with the selected source node to provide the determined value thereto and to request replication information therefrom starting from at least the determined value, receiving replication information from the source node and receiving a copy of the cursor maintained by the source node in response to the communication, replicating objects in the destination replica according to the received replication information, and updating the values in the cursor maintained in the destination node according to the values within the copy of the cursor received from the source node.

19. In a distributed computer system of interconnected replica nodes, a method of replicating objects so as to be consistent among the replica nodes comprising the steps of:

maintaining a replica-object cursor at each replica node, each replica-object cursor including an identity for each connection between at least three replica nodes in the distributed system and a value associated therewith indicating the extent of replication of a node over that connection, and, at a destination node, receiving a request for replication from a destination node, accessing the cursor maintained in the source node to determine which value indicates the extent that the requesting destination node is replicated relative to the source node, communicating with the destination to provide replication information thereto starting from at least the determined value, and transmitting a copy of the cursor maintained by the source node to the destination node.

20. In a distributed computer system of interconnected replica nodes, a method of replicating objects so as to be consistent among the replica nodes comprising the steps of:

maintaining a replica-object cursor at each replica node, each replica-object cursor including an identity for each connection between at least three replica nodes in the distributed system and a value associated therewith indicating the extent of replication of a node over that connection;

selecting, at a destination node, a source node for replication, accessing the cursor maintained in the destination node to determine a first value indicative of the extent that the destination node is replicated relative to the selected source node, communicating with the selected source node to provide the first value thereto and to request replication information therefrom starting from at least the first value;

receiving, at the source node, the first value and the request for replication, accessing the cursor maintained in the source node to determine a second value indicative of the extent that the requesting destination node is replicated relative to the source node, comparing the first value with the second value to determine which value indicates a further extent of replication, communicating with the destination to provide replication information thereto starting from either the first or second value depending on which value indicated a further extent of replication, and transmitting a copy of the cursor maintained by the source node to the destination node; and receiving, at the destination node, the replication information from the source node and receiving a copy of the cursor maintained by the source node in response to the communication, replicating objects in the destination replica according to the received replication information, and updating the values in the cursor maintained in the destination node according to the values within the copy of the cursor received from the source node.

21. In a distributed computer system of interconnected replica nodes, a framework for maintaining information in the system indicative of the extent that objects are replicated among the replica nodes, comprising:

a replica-object cursor at each replica node, each replica-object cursor including an identity for each connection between at least three replica nodes in the distributed system and a value associated therewith indicating the extent of replication of a node over that connection;

means for transmitting a copy of the replica-object cursor from each replica node in the system to at least two other replica nodes in the distributed system connected thereto;

means at each replica node for receiving copies of the replica-object cursors from at least two other replica nodes in the distributed system connected thereto; and means at each replica node for updating the replica-object cursor maintained therein according to the information within the copies of the received replica-object cursors.

22. The system of claim 21 wherein the replica-object cursor maintained at a node is updated such that the values therein are replaced with values that indicate a further extent of replication over a connection.

* * * * *

UNITED STATES PATENT AND TRADEMARK OFFICE
CERTIFICATE OF CORRECTION

PATENT NO. : 6,049,809
DATED : April 11, 2000
INVENTOR(S) : Raman et al

It is certified that error appears in the above-identified patent and that said Letters Patent is hereby corrected as shown below:

On The Title Page:

In [56] References Cited, OTHER PUBLICATIONS, Column 2, line 6: "Secuirty" should read --security--.

In [56] References Cited, OTHER PUBLICATIONS, Page 2, Column 2, line 27: "Locus" should read --LOCUS--.

In the Claims:

In Claim 9, Column 12, line 12: "starting to point" should read --starting point--.

Signed and Sealed this

Seventeenth Day of April, 2001

Attest:

NICHOLAS P. GODICI

*Attesting Officer*      *Acting Director of the United States Patent and Trademark Office*